United States Patent Office 3,496,121
Patented Feb. 17, 1970

3,496,121
PROCESS FOR MAKING WATER-SOLUBLE, THERMOSETTING RESINS OF AZIRIDINE DERIVATIVES
Kwan-Ting Shen, Lakewood, N.J., assignor to Ciba Corporation, New York, N.Y., a corporation of Delaware
No Drawing. Continuation-in-part of application Ser. No. 544,369, Apr. 22, 1966. This application Dec. 27, 1966, Ser. No. 604,534
Int. Cl. C08g *33/08, 23/06*
U.S. Cl. 260—2
10 Claims

ABSTRACT OF THE DISCLOSURE

New water-soluble, thermosetting resins are provided which are the reaction product of approximately equimolar amounts of (1) an imine having 2–5 carbon atoms of the formula

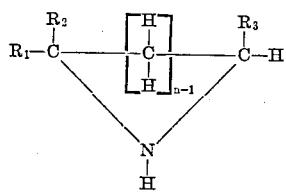

wherein $R_1$, $R_2$ and $R_3$ are hydrogen, methyl or ethyl, and $n$ is 1 or 2 and (2) a polyfunctional compound of the formula

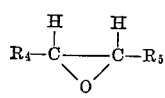

wherein $R_4$ is hydrogen or lower alkyl and $R_5$ is a radical such as $-CH_2Br$, $-CH_2Cl$, $-CH_2I$,

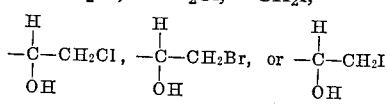

A novel process is provided for manufacturing said resins. The resins of this invention are particularly useful as wet strength agents, drainage assistants and retention aids.

CROSS REFERENCE

This application is a continuation-in-part of applicant's copending application Ser. No. 544,369 filed Apr. 22, 1966 and now abandoned, the disclosure of which is relied on and incorporated by reference in this application.

BACKGROUND

This invention relates to a novel process for preparing water-soluble, thermosetting, paper treating resins and to the products produced by the novel process.

Considerable difficulties have been encountered in the manufacture of papers having both high absorbancy and a high ratio of wet strength to dry strength. Absorbancy and wet strength are in general divergent properties. Mechanical paper making processes which increase wet strength simultaneously decrease absorbancy. Accordingly, papers which require a high degree of absorbancy, for example paper towelling, inherently exhibit poor wet strength and unfortunately it is this type of paper which requires a high ratio of wet strength to dry strength.

An additional problem encountered in the manufacture of paper is control of the drainage rate of water from the paper stock as it is formed. The more paper fibers are mechanicallly modified, the higher the strength of the resultant sheet of paper. However, the additional mechanical work causes the aqueous slurries of the fibers to drain more slowly. This has the adverse effect of reducing the speeds at which the paper machines can be run and thereby increases the manufacturing costs.

A still further problem encountered in the manufacture of paper is retention of particulant materials. Particulant materials are added to paper to impart various properties to the final paper sheet. The materials commonly added are opacity agents, colored pigments, and fillers. Most of these materials are relatively expensive. Accordingly, it is essential that substantial amounts of the material added to the slurry of fibers be retained in the final sheet of paper. However, since most of the particulant materials commonly added to paper have little or no natural affinity for the paper fibers, substantial amounts of the particulant materials are removed along with the white water as the sheet of paper is formed.

Heretofore it was suggested that urea formaldehyde or melamine formaldehyde condensation products could be added to paper fibers to improve the wet strength, to control the freeness of paper stock, and to improve the retention of particular materials. However, certain difficulties are encountered with this type of resin. The resins must be applied in an acid media. Accordingly, these resins cannot be utilized with paper having an alkaline pH or which contain alkaline fillers such as calcium carbonate.

To overcome the above problems it was suggested that certain other types of thermosetting materials could be used. The polyalkylene polyamide resins were suggested. These polyalkylene polyamide resins have a disadvantage in that they are unstable in concentrated form and accordingly must be supplied in relatively diluted solutions, 10% concentrations being normal. The necessity of diluting the polyalkylene polyamide resins is a distinct disadvantage since relatively large volumes of the diluted resins must be maintained in inventory and the costs of shipping and handling are substantially increased.

In U.S.P. 2,296,225 granted to Ulrich, there is a broad teaching of reacting monomeric 1-2 alkylene imines with organic compounds containing an epoxy group to obtain polyalkylene polyamide derivatives. The Ulrich teaching is almost exclusively concerned with the reaction of imine and monofunctional organic compounds, for example ethylene oxide. However, there is a general teaching that epichlorohydrin, a bifunctional compound, could be used in place of the disclosed monofunctional compounds. However, when propylene imine and epichlorohydrin are reacted together according to the Ulrich process, the product is only indicated to be useful as a moth proofing agent.

Those skilled in the art recognized that the modified polyalkylene polyamine might be useful in the manufacture of paper. In Daniel, U.S.P. 2,595,935, as well as others, alternative processes were suggested for producing polyalkylene polyamine resins. Daniel suggested starting with a lower molecular weight polyalkylene polyamine, such as tetraethylenepentamine and adding side chains of bifunctional compounds, such as dichlorohydrin or epichlorohydrin, but, as far as Applicant is aware, this process has never been commercialized.

Attempts to produce polyalkylene polyamine derivatives directly from a monomeric cyclic imine and bifunctional compound in a ratio approaching 1 to 1 have heretofore been notoriously unsuccessful. For example, Belgium Patent 649,883 disclosed a process wherein a monomeric cyclic imine is reacted with a bifunctional compound, for example epichlorohydrin. However, the ratio of monomeric imine to bifunctional compound was at least 3 mols of imine to only one mol of the bifunctional compound. Accordingly, the compounds produced by the process of the Belgium patent inherently did not produce the best thermosetting properties possible and accordingly did not possess the optimum wet strength properties. Furthermore, it was found that in actual practice the process disclosed in the Belgium patent tended to produce insoluble gels similar to those of Ulrich even when the higher ratios of imine to bifunctional compound disclosed in the patent were utilized.

It is one of the objects of this invention to overcome the aforementioned problems and disadvantages of the prior art compounds and processes.

It is an additional object of the invention to provide a process for preparing water-soluble, thermosetting polyalkylene derivatives from approximately equimolar quantities of a monomeric imine and a bifunctional compound.

It is a still further object of this invention to provide an improved wet strength resin, retention aid, and drainage assistant for paper manufacture.

Other objects and advantages of the present invention will become further apparent from a reading of the specification and the subjoined claims.

BRIEF SUMMARY

Briefly the objects of this invention are obtained by initially reacting approximately equimolar quantities of a monomeric imine and a bifunctional compound in the presence of certain reaction modifiers at a temperature below the self-polymerization temperature of the imine. After the initial reaction is substantially completed, the temperature of the reaction mixture is raised to and maintained at a temperature sufficient to cause polymerization until a water-soluble thermosetting product is obtained.

DETAILED DESCRIPTION

The monomeric cyclic imines which are suitable for employment in this invention may be represented by the structural formula I
$$R_1-C(R_2)-[CH_2]_{n-1}-C(R_3)-H$$
with N-H bridging wherein $R_1$, $R_2$, and $R_3$ are hydrogen, methyl, or ethyl and $n$ is a whole number of 1 or 2. The cyclic imines suitable for employment in this invention have 2–5 carbon atoms. Among the group of 1,2 and 1,3 alkylene imines represented by Formula I, ethylene imine, propylene imine, 1,2 butylene imine, 1,3 butylene imine, and trimethylene imine deserve special attention. Of the above-named imines, ethylene imine is of particular importance. Accordingly, this invention will be illustrated with particular attention directed to this compound.

The bifunctional compounds suitable for employment in this invention are represented by the formula II
$$R_4-C(H)-C(H)-R_5$$ with O bridging wherein $R_4$ represents hydrogen and a lower alkyl of 1–4 carbon atoms and $R_5$ represents a radical of the formulas —$CH_2$—Cl, $CH_2$—I, —$CH_2$—Br, —CH—$CH_2$—Br   —$CH_2$—$CH_2$—I  and  —CH—$CH_2$—Cl
    |                                    |
    OH                OH                  OH Compounds of Formula II which have been found to be especially useful in this invention are epichlorohydrin, 2 methyl epichlorohydrin, 3 methyl epichlorohydrin, 3-isopropyl epichlorohydrin, epiiodohydrin, and 1-1 dimethyl epichlorohydrin. Of the above-mentioned compounds epichlorohydrin deserves special attention and is the preferred compound for employment in the present invention.

The compounds that are utilized as the reaction modifier in the present invention may be selected from a broad class of compounds. The compounds suitable for this purpose contain at least one nitrogen atom in their structure and are at least partially soluble or dispersable in water. Reaction modifiers suitable for employment in this invention are classified in the following groups:

(a) Alkyl amine having straight chained, branched or cyclic alkyl groups of 1–18 carbon atoms attached to the nitrogen atom. Typical compounds of this class are methylamine, ethylamine, isopropylamine, tertiary butylamine, amylamine, hexylamine, cyclohexylamine, heptylamine, and octylamine.

(b) Di-alkyl amines having straight chained, branched or cyclic alkyl groups having a total of 2–18 carbon atoms attached to the nitrogen atom. Typical compounds of this class are dimethylamine, diethylamine, dinonylamine, dipropylamine, dibutylamine, diamylamine, dihexylamine, di-(2-ethyl hexyl)amine.

(c) Tri-alkyl amines having straight chained, branched or cyclic alkyl groups having a total of 3–20 carbon atoms attached to the nitrogen atom. Typical compounds of this class are trimethylamine, triethylamine, tributylamine, methyldiethylamine, and dimethyloctylamine. Of special interest are the amines of the formula $$R_6-N(CH_3)(CH_3)$$

wherein $R_6$ represents a straight chained, branched and cyclic alkyl group having 11–18 carbon atoms. Compounds of particular note in this class are those in which $R_6$ is a radical of the formula $$R_7-C(H)(CH_3)-$$

wherein $R_7$ is alkyl chain of 11–18 carbon atoms.

(d) Hydroxy alkyl amines having at least one and preferably 1–3 hydroxy groups and one amine group attached to a branched or straight chained alkyl group having a total of 1–18 carbon atoms. Typical members of this class are monoethanolamine, diethanolamine and triethanolamine, 2-amino-1-butanol, 2-amino-2-methyl-1,3-propanediol, 2-amino-2-ethyl-1,3-propanediol and tris(hydroxy-methyl)-aminomethane.

(e) Phenyl amines which are unsubstituted or 1–4 carbon atom lower alkyl or amino substituted. Typical compounds included in this class are aniline, phenylene diamine, and toluidine.

(f) heterocyclic nitrogen containing compounds having 5–7 ring atoms. Typical members of this class are pyrrolidine, piperidine, pyridine, picolines, piperazine, morpholine, N-aminoethyl piperazine, melamine, guanamine, caprolactam, caprolactim and the like. Also included are compounds of the following structure $$R_9-C=N, \text{ with } R_8 \text{ and } X \text{ in ring}$$

in which X is $NR_{10}$, O, and S; $R_8$ is a divalent alkylene radical, e.g. —$CH_2CH_2$—, $CH_3$
          |
      —CH—$CH_2$ etc.; $R_9$ is hydrogen, —$NH_2$ alkyl, cycloalkyl and cycloalkenyl group preferably having 5 to 6 carbon atoms, for example cyclopentyl and cyclohexyl; $R_{10}$ is hydrogen, alkyl group and other functional group containing alkyl groups, such as

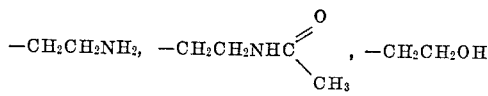

etc.

Specific examples are

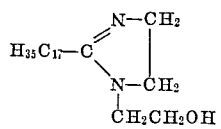

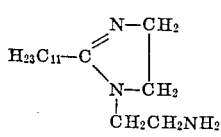

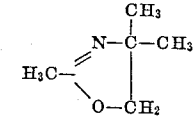

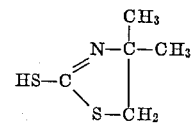

(g) Nitrogen compounds not classified above included in this group are ammonia, urea, cyanamide, dicyandiamide, guanidine, ethylene urea, thiourea, and ethylene thiourea. Included also are the reaction products of the above-named compounds with formaldehyde, glyoxal and the like, for example methylol ureas. Also included in this class are lower alkyl amide, isocyanates, isothiocyanates, carbamates, and their derivatives.

The most important member of the classes of nitrogen containing reaction modifiers listed above is urea. For this reason the invention will be illustrated with particular reference to the processes in which urea is utilized. However, it should be noted that the scope of this invention is not limited to processes in which urea is utilized as the reaction modifier.

Most of the monomeric cyclic imines, polyfunctional compounds, and reaction modifiers described above are well known compounds which may readily be obtained from commercial sources. All compounds described above may also be obtained by utilizing processes well known in the art.

To obtain the maximum amount of cross linking and resultant improvement in properties when the final product is applied to paper, the molar ratio of the monomeric cyclic imine to the polyfunctional compound should be approximately equal. It should be noted, however, that it is not necessary to have exactly equimolar quantities present in order to obtain the benefit of this invention. I has been found, for example, that good results can also be obtained when a ratio of .8-1 molar quantity of the polyfunctional compound to 1 molar quantity of the monomeric cyclic imine is used. Accordingly, the term approximately equimolar quantities is to be interpreted to include ratios of .8-1 of the bifunctional compound to one molar equivalent of the monomeric cyclic imine.

The amount of reaction modifier required will vary somewhat according to the particular imine, polyfunctional compound, and reaction modifier utilized. The amount of reaction modifier present should be sufficient to prevent gellation during the process. The optimum amount required can readily be determined by preparing a series of small batches with varying amounts of the reaction modifier. It has been found, however, that an amount of reaction modifier between 5-15% based on the total weight of the monomeric cyclic imine and polyfunctional compound is sufficient to prevent gellation during the reaction. More specifically, it has been found that when approximately equimolar equivalents of ethylene imine and epichlorohydrin are reacted together that approximately 10% urea present in the mixture tends to prevent gellation. Within reasonable limits, excess amounts of the reaction modifier can be used without any adverse effects on the final product.

The preferred reaction media is water. The relative amount of water utilized can be varied over a wide range. It has been found, however, that an amount of water approximately equal to the weight of the quantity of the polyfunctional compound gives good results. Excessively larger volumes of water should be avoided in that the reaction will be relatively slower, and any excess water present may have to be stripped from the final product to form the desired concentrated product.

The reaction modifier is preferably added to the aqueous reaction media before the addition of the monomeric cyclic imine and polyfunctional compound. Some of the reaction modifiers defined above are water-soluble while other of the reaction modifiers are only water dispersable. The reaction modifier is either dissolved or dispersed in the aqueous reaction media and maintained in a uniform dispersion in the reaction media by continuous agitation.

The aqueous reaction media containing the reaction modifier is cooled to a temperature which is below the temperature at which the cyclic imine will polymerize in the presence of an acid and above the freezing point of the aqueous solution. The cyclic imines defined above will readily polymerize at relatively low temperatures in the presence of acids such as hydrohalic acids. The polymerization temperature of the specified monomeric cyclic imines varies somewhat. However, most will polymerize to a substantial degree at a temperature above 25° C. in the presence of hydrochloric acid. Accordingly, in order to prevent premature polymerization of the cyclic imine, the reaction media is maintained substantially below the polymerization temperature of the monomeric cyclic imine, preferably at least 5-10° C., below the polymerization temperature. It has been found that if the temperature is maintained between 5 and 20° C. during the initial process steps, a product with optimum properties is obtained.

The monomeric cyclic imine and the polyfunctional compound are added to the aqueous reaction medium. The order of addition is not critical. The cyclic imine may be added first, followed by the polyfunctional compound, or the polyfunctional compound may be added first followed by the cyclic imine compound. Both the polyfunctional compound and the cyclic imine may be added simultaneously, if they are added separately and blended with the aqueous media as they are added.

The addition of the cyclic imine an polyfunctional compound should be made relatively slowly. The temperature of the resulting mixture should be maintained at 5-20° C. during this addition. The maintenance of the 5-20° C. temperature is especially important when the monomeric cyclic imine is added for the reasons noted above.

After all the cyclic imines and polyfunctional compounds have been added to the reaction media, the resulting mixture is agitated and maintained at a temperature below the polymerization temperature of the cyclic imide, preferably 5-20° C., until substantially all of the polyfunctional compound has reacted. Depending on the temperature employed and the particular reactant utilized, this should take approximately 2–5 hours.

When the above step is completed and substantially all of the polyfunctional compound has reacted, the temperature of the resultant mixture is raised to a temperature at which the imine ring will open and polymerize in the presence of an acid. This temperature is generally above 25° C., depending on the particular imine employed. The preferred temperature range is approximately 30–50° C. in that the imine will readily polymerize in this range, and the reaction is sufficiently slow as to be easily controlled. The object of this step is to cause the imine rings to open and form polymers. However, in order to obtain a water-soluble product as opposed to the solids and gels obtained in the prior art, the temperature should be controlled within rather close limits at this stage to prevent stantial amounts of cross linking.

The temperature of the reaction mixture is maintained at the aforesaid 30–50° C. until a clear water-soluble product is obtained. In general, it has been found that when the reaction mixture is heated to about 50° C., during this stage that the clear liquid product is obtained in approximately one hour. However, in order to obtain the optimum results the product should be frequently sampled until the clear product is obtained rather than relying on the length of reaction time.

It should also be noted that during both the 5–20° C. process step and the 30–50° C. process step that the pH of the reaction mixture shows a gradual downward trend. This may in part be due to the release of a hydrohalic acid by the bifunctional compound as it reacts. It has been found that as the pH of the reaction mixture approaches the neutral point, the clear liquid product is generally obtained.

As soon as the clear liquid product is obtained, an amount of water sufficient to quench the reaction is added to the reaction mixture. This amount of water can vary somewhat. An amount of water equivalent to 15–25% of the weight of the clear product is generally sufficient. It has been found to be of some advantage for stabilizing purposes to add small amounts of acid at this point in addition to the water.

The solid content of the resin produced by this process is approximately 50–80% and may be adjusted to lower concentrations. Concentrations between approximately 20 and 50% have been found to be the preferable concentrations, with about 40% being the optimum concentration.

In using the products of this invention as paper additives, the products are incorporated into the paper by adding them to the paper pulp prior to sheet formation. Thus, the products can suitably be added to a dilute aqueous suspension of paper pulp, as for example, in the procedure of a paper-making system. The products are most effectively added in the form of an aqueous solution. In general, the concentration of the product in the aqueous solution will be on the order of about 1 to about 10%. The products, in whatever form they are employed, are added to the paper pulp in amounts within the range of from about 0.1 to about 5.0%. It is, of course, possible to employ quantities above the upper range of 5%. However, the improvements in the desired characteristics obtained by the addition of larger quantities is not sufficient to warrant the use of such larger quantities. Hence, additions of about 5% represent the practical upper limit for addition of the products.

The following examples illustrate the invention.

Example 1

29.80 kgs. of water are charged into a 100 liter stainless steel reaction vessel having a heat exchange jacket and an anchor stirrer. 46.07 kgs. of urea are dissolved in the water. The mixture is cooled to about 0° C. by circulating brime through the jacket. With good agitation 12.90 kgs. of ethylene imine are added over a ten minute period. The temperature is raised to 16° C. and 27.75 kgs. of epichlorohydrin are added with vigorous stirring (110 r.p.m.) over a three hour period. The temperature of the resulting mixture is maintained between 15 and 18° C. for an additional two hours. Thereafter the reaction mixture is raised to a temperature of 50° C. and maintained at this temperature until a clear liquid product is obtained. Immediately thereafter the product is diluted with 37.38 kgs. of water containing 2.40 kgs. of hydrochloric acid. The final product is adjusted to a pH of 5±.5 with additional hydrochloric acid. The final product is a clear, slightly yellowish-green liquid having a solid content of 40.5%.

Example 2

The procedure of Example 1 is repeated with the exception that 17.20 kgs. of propylene imine are used in place of the 12.90 kgs. of ethylene imine in Example 1.

Example 3

The procedure of Example 1 was repeated with the exception that 22.05 kgs. of epichlorohydrin was used.

Example 4

17.2 parts of dicyandiamide and 185.0 parts of epichorohydrin are charged in a reaction flask containing 432.3 parts of water with continuous stirring, 86.0 parts of ethylene imine are added uniformly over 2 hours. During this phase of the reaction, the temperature is kept at 18–20° C. Upon completion of the addition of the ethylene imine, the reaction mixture is held at 18–20° C. for 2 hours and is then heated to 50° C. in 25 minutes. Heating is continued at 50° C. for another 40 minutes. The flask is then cooled to 25° C. and the product recovered as a light greenish-yellow clear solution with a pH of 6.5, a solids content of 41.9% and a Gardner viscosity of about G at 25° C.

Example 5

In a reaction vessel, 27.1 parts of acrylonitrile are dissolved in 198.7 parts of water. 86.0 parts of ethylene imine are added in 5 minutes while the temperature is maintained at 15° C. 185.0 parts of epichlorohydrin are added uniformly over 3 hours at 15° C. with ice-bath cooling. The reaction mixture is held for 2 hours at 15° C. with stirring and then heated to 50° C. It is maintained at 50° C. for 20 minutes. 248.5 parts of water are then added. The reaction mixture is cooled to 25° C. and adjusted with 24.3 parts of 37% HCl to a pH of 4.5. The product is recovered as a clear to slightly hazy solution having a solids content of 38.7%.

Example 6

In a reaction flask, 27.1 parts of urea are dissolved in 198.7 parts of water. To this solution there are added 86.0 parts of ethylene imine in 5 minutes while the temperature is maintained at 15° C. 185.0 parts of epichlorohydrin are then added uniformly in 3 hours at 15° C. with ice-bath cooling. The reaction mixture is stirred for 2 hours at 15° C. and then heated to 50° C. and maintained at this temperature for 30 minutes. 248.5 parts of water are then added uniformly in 45 minutes. The resulting solution is stirred for 15 mintues at 50° C. and cooled at 25° C. 16.0 parts of 37% HCl are added to adjust the pH to 4.5. The product is recovered as a slightly greenish-yellow clear solution with a solids content of 41% and a Gardner viscosity of H at 25° C.

Examples 7–22

The procedure of Example 6 is repeated except that in each instance the indicated quantity of urea employed in Example 6 was replaced by the same quantity of the reactants listed below.

7—methylamine
8—isopropylamine

9—piperazine
10—bis(2-aminoethyl)sulfide
11—diethanolamine
12—melamine
13—melamine ether
14—dimethylolurea
15—tris(hydroxymethyl)amine methane
16—dimethyl tetradecylamine
17—dimethyl hexadecylamine
18—dimethyl octadecylamine
19—

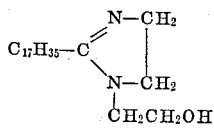

20—dimethylamine propylamine
21—N-methyl glucamine
22—tetrahydrofurfurylamine.

Example 23

Bleached sulfite pulp is beaten to a freeness of 420 to 425 Canadian Standard. At the completion of the beating cycle, sufficient titanium dioxide is added to provide a composition comprising 90% bone dry fiber and 10% titanium dioxide. The retention aid is added to a diluted slurry of the fiber at the head box of the paper machine. The finished paper is cut to provide 10 gram samples which are then ashed at 925° C. in accordance with the test procedure set forth in TAPPI T 413 m 58. The percent retention is calculated on the basis of the ash content of the sheet divided by the ash content of the furnish. It is found that the percent retention is satisfactory and compares favorably with most retention aids now in use in industry. In the table below, the percent retention of titanium dioxide in pounds per ton for the varying concentrations of the reaction product of Example 6 are set forth.

Percent TiO₂ Retention

| Lbs./ton: | Product of Example 3 |
|---|---|
| 0.05 | 12 |
| 0.1 | 19 |
| 0.2 | 49 |
| 0.25 | 57 |
| 0.5 | 73 |
| 0.75 | 79 |
| 1.0 | 83 |
| 0.0 | 9 |

Example 24

Specimens of pulp suspension are prepared by immersing the pulp in water employing a conventional mixer and the pulp is then beaten in a Valley Beater to a Canadian Standard Freeness of 450 ml. The pulp is diluted to a final concentration of 1.25 parts of bone dry pulp per liter of solution. The products of Examples 1–21 are added to the pulp in an amount to provide the concentration indicated in the table below. After addition of the products, the pulp is mixed for a period of about five minutes and sheets then prepared in a hand-sheet mold. From 40 to 60 sheets with blotters are pressed in a Williams Standard Pulp Press at a pressure of 1,000 lbs. for a period of 80 seconds. The sheets are then removed with blotters and dried at 275° F. for a period of three minutes.

The dried sheets are then conditioned for twenty-four hours at 50% relative humidity and the sheets cut into six equal strips. Three strips are tested for dry strength and three sheets for wet strength following immersion for ten seconds in distilled water with a Finch Wet-Strength Tensile Tester. The results are calculated as percent activity of the wet strength with respect to dry strength.

| Example Number: | Lbs./Ton | | |
|---|---|---|---|
| | 4 | 10 | 20 |
| 4 | 20.3 | 23.3 | 26.1 |
| 5 | 14.1 | 18.2 | 22.0 |
| 6 | 20.5 | 24.7 | 25.9 |
| 7 | 13.4 | 21.0 | 20.7 |
| 8 | 19.4 | 23.1 | 23.9 |
| 9 | 13.7 | 19.4 | 20.1 |
| 10 | 16.9 | 24.3 | 27.2 |
| 11 | 14.0 | 21.2 | 23.2 |
| 12 | 15.2 | 19.8 | 22.3 |
| 13 | 23.2 | 26.9 | 25.7 |
| 14 | 19.6 | 25.7 | 27.7 |
| 15 | 16.4 | 23.8 | 25.4 |
| 16 | 18.1 | 26.0 | 28.6 |
| 17 | 18.9 | 26.9 | 27.3 |
| 18 | 20.3 | 25.1 | 27.7 |
| 19 | 16.8 | 21.9 | 26.4 |
| 20 | 16.5 | 21.8 | 24.9 |
| 21 | 16.4 | 24.2 | 27.8 |
| 22 | 16.5 | 20.1 | 20.5 |

What is claimed is:
1. The process for preparing water-soluble, thermosetting resins for paper treatment comprising adding approximately equimolar quantities of (1) a monomeric cyclic imine of the formula

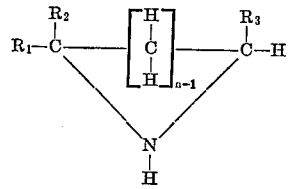

wherein $R_1$, $R_2$, and $R_3$ are members selected from the group consisting of hydrogen, methyl, and ethyl, $n$ is a whole number from 1–2, the total number of carbon atoms in said imine being 2–5, and (2) a polyfunctional compound of the formula

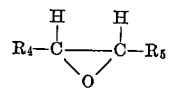

wherein $R_4$ represents a member selected from the group consisting of hydrogen and lower alkyl of 1 to 4 carbon atoms, and $R_5$ represents a member selected from the group consisting of —CH₂—Cl, —CH₂—Br, —CH₂—I,

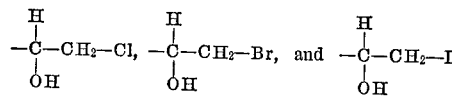

to an aqueous solution containing an effective amount of a reaction modifier, said amount being sufficient to prevent gellation of the reaction product of said monomeric cyclic imine and polyfunctional compound, said reaction modifier being a member selected from the group consisting of alkyl amines having 1–18 carbon atoms, di-alkyl amines having 2–18 carbon atoms, tri-alkyl-amines having 3–22 carbon atoms, hydroxyl alkyl amines having 1–18 carbon atoms, heterocyclic nitrogen containing compounds having 5–7 ring atoms, aniline, phenylene, diamine, urea, thiourea, cyanamide, dicyandiamide, guanidine, ethylene urea, ethylene thiourea, and methylol urea; maintaining the temperature of the mixture of cyclic imine, polyfunctional compound and aqueous solution of reaction modifier at about 5–20° C. for approximately 2–5 hours, raising the temperature of the resultant mixture to about 30–50° C.; maintaining said 30–50° C. temperature until a clear liquid product is obtained; immediately thereafter diluting said clear liquid product with water to a solid content of about 20–45% of said clear liquid product.

2. The process according to claim 1 wherein the cyclic imine is selected from the group consisting of ethylene imine, propylene imine, 1,2 butylene imine, 1,3 butylene imine and trimethylene imine.

3. The process according to claim 2 wherein the polyfunctional compound is epichlorohydrin.

4. The process according to claim 3 wherein the reaction modifier is present in an amount of 5–15% based on the total weight of the cyclic imine and epichlorohydrin quantities.

5. The process according to claim 4 wherein the reaction modifier is urea.

6. The process according to claim 5 wherein the cyclic imine is ethylene imine.

7. The process according to claim 6 wherein the mixture of ethylene imine, epichlorohydrin, and urea is maintained at a temperature between 5–20° C. until substantially all the epichlorohydrin has reacted.

8. The process according to claim 4 wherein the reaction modifier is represented by the formula

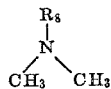

wherein $R_8$ is an alkyl group having 13–20 carbon atoms.

9. The process according to claim 1 wherein approximately equimolar quantities of (1) ethylene imine and (2) epichlorohydrin are separately added with agitation to an amount of water approximately the weight of epichlorohydrin quantity, said amount of water having dissolved therein, approximately 10% by weight of urea based on the total weight of ethylene imine and epichlorohydrin; maintaining the temperature of the resultant mixture between 15 and 18° C. for a period of approximately two hours; raising the temperature to approximately 50° until a clear liquid product is obtained; immediately thereafter diluting the said product with a sufficient amount of water to adjust the final solid content of said clear liquid product to approximately 40% by weight.

10. The process according to claim 9 wherein the ratio of the ethylene imine to epichlorohydrin is 1 to .8–1 respectively.

References Cited

UNITED STATES PATENTS 2,272,489   2/1942   Ulrich.
3,294,723   12/1966   Goldstein et al.

WILLIAM H. SHORT, Primary Examiner

T. PERTILLA, Assistant Examiner

U.S. Cl. X.R.

260—29.2